US011474924B2

(12) United States Patent
Haberstro

(10) Patent No.: US 11,474,924 B2
(45) Date of Patent: Oct. 18, 2022

(54) GRAPHICS PROCESSING UNIT PERFORMANCE ANALYSIS TOOL

(71) Applicant: Apple Inc., Cupertino, CA (US)

(72) Inventor: Jedd O. Haberstro, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 356 days.

(21) Appl. No.: 16/740,140

(22) Filed: Jan. 10, 2020

(65) Prior Publication Data
US 2020/0379864 A1 Dec. 3, 2020

Related U.S. Application Data

(60) Provisional application No. 62/855,521, filed on May 31, 2019.

(51) Int. Cl.
| | |
|---|---|
| *G06T 15/00* | (2011.01) |
| *G06F 11/34* | (2006.01) |
| *G06T 1/20* | (2006.01) |
| *G06F 11/30* | (2006.01) |

(52) U.S. Cl.
CPC ...... *G06F 11/3409* (2013.01); *G06F 11/3037* (2013.01); *G06T 1/20* (2013.01); *G06T 15/005* (2013.01)

(58) Field of Classification Search
None
See application file for complete search history.

(56) References Cited

U.S. PATENT DOCUMENTS

2019/0139183 A1* 5/2019 Goldman ............... G06T 15/005
2020/0210317 A1* 7/2020 Shin ..................... G06F 11/3409

* cited by examiner

*Primary Examiner* — Robert J Craddock
(74) *Attorney, Agent, or Firm* — Blank Rome LLP

(57) ABSTRACT

Systems, methods, and computer readable media to analyze and improve the performance of applications utilizing graphics hardware are described. In general, techniques are disclosed to monitor the run-time performance of various shader programs from multiple applications executing concurrently on a graphics processing unit (GPU) and present a visualization of such performance to a user. More particularly, the GPU performance profiling comprises sampling data from multiple hardware performance counters and shader programs during the execution of the shader programs on the GPU. The hardware counters may be indicative of the status of various performance and/or architectural limitations of the GPU at a given moment in time. By time-correlating the execution of the various shader programs and the responses of the multiple hardware counters, a more instructive visualization may be presented to the user, which may be used, e.g., as an aid in debugging and/or profiling the applications executing on the GPU.

20 Claims, 5 Drawing Sheets

| APPLICATION A 270 | PHOTOS 271 | FINANCE APP. 272 | IMOVIE 273 | APPLICATION B 274 | ⎫ 275 |
|---|---|---|---|---|---|
| OTHER APPLICATION SERVICES 260 | SPRITE KIT 261 | SCENE KIT 262 | CORE ANIMATION 263 | CORE GRAPHICS 264 | ⎫ 280 |
| O/S SERVICES 250 | OPENGL / OPENCL 251 | METAL 252 | USER SPACE DRIVERS 253 | SOFTWARE RASTERIZER 254 | ⎫ 285 |
| O/S KERNEL 245 | | | | | ⎫ 290 |
| HARDWARE 240 | | | | | ⎫ 295 |

*FIG. 2*

GRAPHICS PROCESSING UNIT PERFORMANCE ANALYSIS TOOL

TECHNICAL FIELD

This disclosure relates generally to the field of graphics processing. More particularly, but not by way of limitation, this disclosure relates to techniques for analyzing and visualizing the performance of graphics hardware, such as a graphics processing unit (GPU), on a system-wide level, e.g., during the execution of one or more applications by the system.

BACKGROUND

Computers, mobile devices, and other computing systems typically have at least one programmable processor, such as a central processing unit (CPU) and other programmable processors specialized for performing certain processes or functions (e.g., graphics processing). Examples of a programmable processor specialized to perform graphics processing operations include, but are not limited to: a GPU, a digital signal processor (DSP), a field programmable gate array (FPGA), and/or a CPU emulating a GPU.

GPUs, in particular, typically comprise multiple execution cores (also referred to as shader cores) designed to execute commands on parallel data streams, making them more effective than general-purpose processors for operations that process large blocks of data in parallel. For instance, a CPU may function as a host and hand-off specialized parallel tasks to the GPUs. Specifically, a CPU can execute an application stored in system memory that includes graphics data associated with a video frame. Rather than processing the graphics data, the CPU forwards the graphics data to the GPU for processing; thereby, freeing the CPU to perform other tasks concurrently with the GPU's processing of the graphics data.

Many present-day portable device applications are graphics intensive. To support the needed graphics operations effectively, it can be particularly important to be able to analyze and optimize shader program performance—as a few (or even a single) inefficiently executing shader program can have a noticeably deleterious effect on a program or a system's overall behavior. For at least these reasons, it is important to be able to obtain accurate quantitative metrics of graphics hardware performance and to be able to correlate such metrics with the particular shader programs executing across all applications on a given system during a given time interval.

SUMMARY

In one implementation, a method is described to monitor, profile, characterize, and visualize the run-time performance of one or more shader programs executing across multiple applications on a graphics processing unit. In an embodiment, one or more graphics hardware performance metrics are obtained and correlated with the one or more shader programs executing on the GPU during a given time interval. More particularly, in one embodiment, the visualization of the run-time performance of the one or more shader programs comprises correlating the execution of the one or more shader programs and the values of the one or more graphics hardware performance metrics to a common timeline, which may be viewed or interacted with by the programmer or other user.

According to some embodiments disclosed herein, the a shader profiling technique operates via a single-pass operation, i.e., by obtaining all necessary graphics hardware performance metrics in 'real-time,' rather than by replaying the application programming interface (API) trace of a single application multiple times to harvest performance metrics. By using the visualization tools described herein, the programmers or other users of a given system may more clearly correlate and understand which shaders (i.e., from among the various shaders that were executing during a particular time interval) that were executing at what times led to which particular hardware performance issues for the graphics hardware (e.g., the exceeding of a particular architectural limitation of the graphics hardware), thus giving the programmers or other users the ability to more effectively target their efforts to improve their shaders' code for more efficient execution on the graphics hardware.

In one implementation, the graphics hardware performance metrics may comprise stochastic shader profiling samples, which may be used to determine which shaders were being executed at which moments during the time interval in which the run time performance of the graphics hardware was being monitored. In other implementations, the visualization of the run-time performance may comprise a groupable and/or collapsible visualization of the determined execution intervals of each of the shader programs executing across any or all applications running on the computing device (e.g., grouping each shader program together by the application that called it)—without a programmer or user having to explicitly point to the application or application(s) he or she wishes to monitor during the time interval. In still other implementations, the graphics hardware comprises a tile-based deferred rendering (TBDR) architecture.

Each of the above described methods, and variations thereof, may be implemented as a series of computer executable instructions executed on a programmable control device. Such instructions may use any one or more convenient programming language. Such instructions may be collected into engines and/or programs and stored in any media that is readable and executable by a computer system, electronic device, or other programmable control device.

BRIEF DESCRIPTION OF THE DRAWINGS

While certain implementations will be described in connection with the illustrative implementations shown herein, this disclosure is not limited to those implementations. On the contrary, all alternatives, modifications, and equivalents are included within the spirit and scope of the invention as defined by the claims. In the drawings, which are not to scale, the same reference numerals are used throughout the description and in the drawing figures for components and elements having the same structure, and primed reference numerals are used for components and elements having a similar function and construction to those components and elements having the same unprimed reference numerals.

FIG. 2 is a block diagram of an implementation of a software layer and architecture where implementations of the present disclosure may operate.

DETAILED DESCRIPTION

Figure 1:
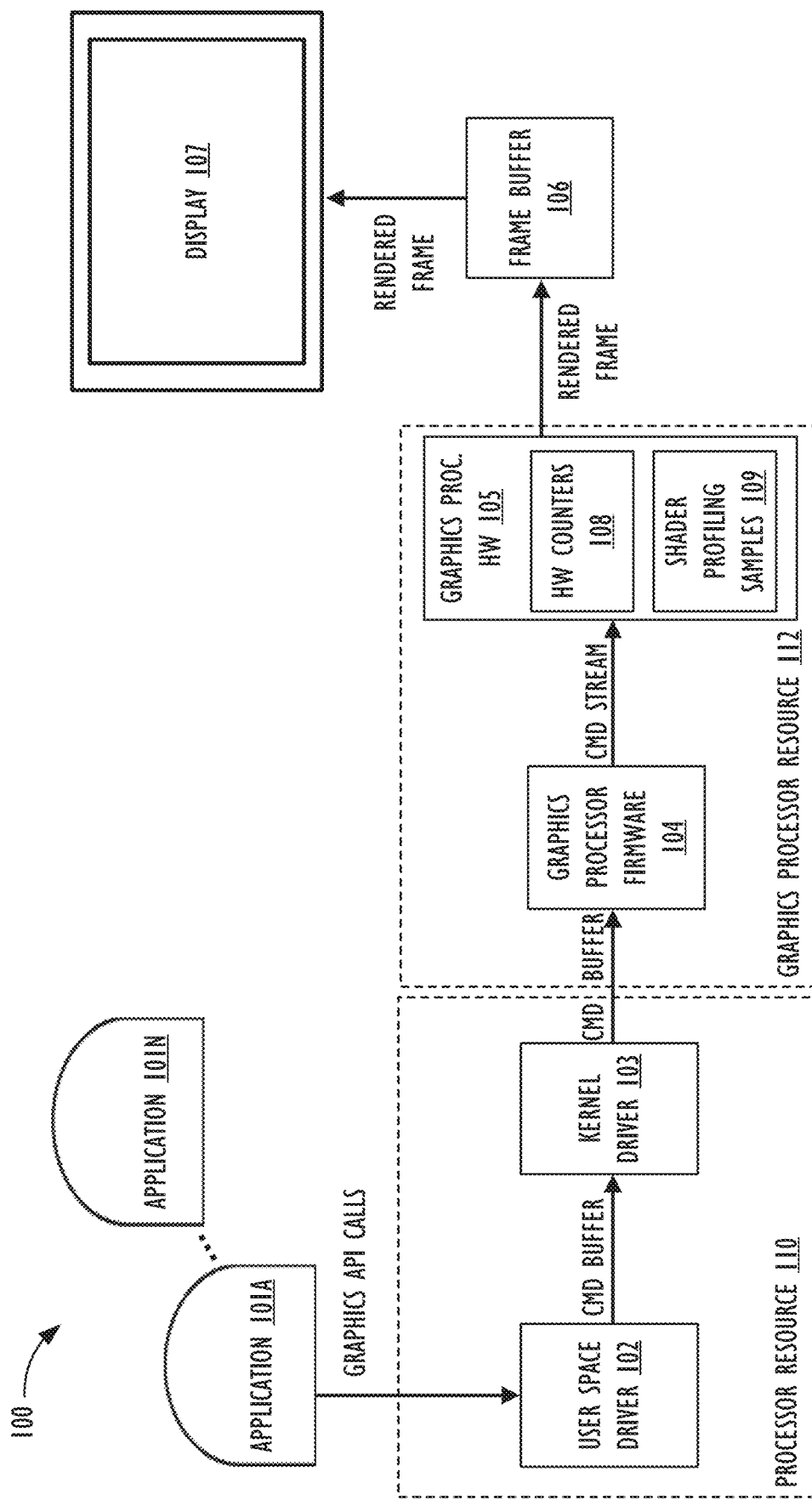
FIG. 1 is a diagram of a graphics processing path where implementations of the present disclosure may operate.

This disclosure includes various systems, methods, and computer readable media to analyze and improve the performance of application programs utilizing graphics hardware. In general, techniques are disclosed herein to monitor the run-time performance of various shader programs from multiple applications executing concurrently on a GPU and present a visualization of such performance to a user. More particularly, the GPU performance profiling comprises sampling (e.g., stochastically) data from multiple shader programs executing on the GPU to determine approximated shader execution intervals. The GPU performance profiling may also comprise collecting the values of one or more hardware counters from the GPU. The hardware counters may be indicative of the status of various performance and/or architectural limitations of the GPU at a given moment in time. By time-correlating the execution of the various shader programs and the responses of the multiple hardware counters, a more instructive visualization may be presented to the user, which may be used, e.g., as an aid in debugging and/or profiling the applications executing on the GPU.

One of challenges faced when attempting to debug and/or profile GPU applications, especially on GPUs that utilize a TBDR architecture, is that programmers don't typically have visibility into when different GPU shader programs are executing, and, thus, there is no easy way to quantify the performance cost of individual shader programs at different points in the applications' lifetimes.

With GPUs that utilize an immediate mode rendering (IMR) architecture, i.e., rather than a TBDR architecture, if a programmer issues a sequence of different shader programs, the GPU will largely encode them as a sequence of commands to be executed in the same temporal order specified by the programmer. Because of this, IMR GPUs typically have clear boundaries around different units of work that the GPU can easily convey to debug and performance tools.

In contrast, a TBDR GPU will typically encode and execute a given sequence of work in a very different manner, e.g., in order to attempt to exploit properties of the programs that lead to better performance/power characteristics than IMR GPUs. In particular, on some TBDR GPUs, the GPU driver software is configured to attempt to encode all vertex shader programs into one macro-command (also referred to herein as a "kick"), all pixel shader programs into another macro-command, and all compute shader programs into yet another macro-commands.

In prior debugging and profiling applications for TBDR GPUs, it would be possible to determine when particular kicks of work begin and end on the GPU, but it has not been possible to determine or visualize the timings of different work encoded within the different kicks. Further, in some instances, even within a particular kick (e.g., a pixel shader kick), at TBDR GPU may traverse the commands in a "pseudo-spatial-temporal" order (i.e., attempting to execute all of the shaders that affect one tile of the screen before going on to execute the shaders for the next tile on the screen), meaning that execution of a single pixel shader program may itself be disjoint in time—or even completely elided-further complicating the programmer's ability to glean useful information from any such debugging or profiling tool.

Definitions

As used herein, the terms "shader program" or "shader" refer to programs specifically designed to execute on GPU hardware. Illustrative types of shader programs include vertex, geometry, tessellation (e.g., hull and domain) fragment (also referred to as pixel), and compute shaders. While the claimed subject matter is not so limited, vertex, fragment, and compute shaders will primarily be discussed herein for illustrative purposes. In general, vertex shaders provide control over the position and other attributes in scenes involving three-dimensional (3D) models. In particular, vertex shaders transform each vertex's 3D position in virtual space to the corresponding two-dimensional (2D) coordinate at which it will appear on a screen. Output from a vertex shader may be sent directly to a rasterizer or to the next stage in a GPU's pipeline (e.g., a fragment shader). Fragment shaders, also known as pixel shaders, may be used to compute the color and other attributes of each pixel. Fragment shaders may, for example, be used to output a constant color or for the application of lighting values, shadows, specular highlights, and translucency. Compute shaders may, for example, be used to perform generic computational operations that may or may not have any relation to graphics.

As used herein, "counter" or "hardware counter" refers to a component within a computing system that may be used to count the real-time occurrences of a particular event or action, which events or actions are typically specific to the micro-architectural implementation of the GPU and relate to events or actions undertaken by the GPU.

As used herein, the term "limiter" refers to a performance metric that may be derived from one or more hardware counters. For example, there may be a formula that is used to combine one or more hardware counters into a limiter value. Limiters may be used to measure factors that have the potential to limit the performance of application(s) running on the GPU. The exact set of limiters derived for a given GPU are a function of the architecture of the GPU, but may be designed and communicated in a such a way that application developers may correlate their meaning with operations performed by their shaders.

As used herein, the term "kernel" in this disclosure refers to a computer program that is part of a core layer of an operating system typically associated with relatively higher or the highest security level. The "kernel" is able to perform certain tasks, such as managing hardware interaction (e.g., the use of hardware drivers) and handling interrupts for the operating system. To prevent application programs or other processes within a user space from interfering with the "kernel," the code for the "kernel" is typically loaded into a separate and protected area of memory. Within this context, the term "kernel" may be interchangeable throughout this disclosure with the term "operating system kernel."

The term "compute shader," as used herein, refers to a program for a graphics processor that performs general compute operations (e.g., compute commands), and the term "graphics shader," as used herein, refers specifically to a program for a graphics processor that performs graphics operations (e.g., render commands).

As used herein, the term "command" refers to a graphics API command encoded within a data structure, such as command buffer or command list. The term "command" can refer to a render command (e.g., for draw calls) and/or a compute command (e.g., for dispatch calls) that a graphics processor is able to execute. The terms "render command" and "compute command" are well-known terms of art understood by skilled artisans in the field of graphics processing.

For the purposes of this disclosure, the term "processor" refers to a programmable hardware device that is able to process data from one or more data sources, such as memory. One type of "processor" is a general-purpose processor (e.g., a CPU) that is not customized to perform specific operations (e.g., processes, calculations, functions, or tasks), and instead is built to perform general compute operations. Other types of "processors" are specialized processor customized to perform specific operations (e.g., processes, calculations, functions, or tasks). Non-limiting examples of specialized processors include GPUs, floating-point processing units (FPUs), DSPs, FPGAs, application-specific integrated circuits (ASICs), and embedded processors (e.g., universal serial bus (USB) controllers).

As used herein, the term "graphics processor" refers to a specialized processor for performing graphics processing operations. Examples of "graphics processors" include, but are not limited to, a GPU, DSPs, FPGAs, and/or a CPU emulating a GPU. In one or more implementations, graphics processors are also able to perform non-specialized operations that a general-purpose processor is able to perform. As previously presented, examples of these general compute operations are compute commands associated with compute shaders.

In the following description, for purposes of explanation, numerous specific details are set forth in order to provide a thorough understanding of the inventive concept. As part of this description, some of this disclosure's drawings represent structures and devices in block diagram form in order to avoid obscuring the disclosed principles. In the interest of clarity, not all features of an actual implementation are necessarily described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one implementation" or to "an implementation" means that a particular feature, structure, or characteristic described in connection with the implementation is included in at least one implementation, and multiple references to "one implementation" or "an implementation" should not be understood as necessarily all referring to the same implementation.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

Illustrative Graphics Processing Path

FIG. 1 is a diagram of a graphics processing path 100 where implementations of the present disclosure may operate. FIG. 1 illustrates that the graphics processing path 100 utilizes a processor resource 110 and a graphics processor resource 112. The processor resource 110 includes one or more general-purpose processors (e.g., CPUs), where each processor has one or more cores. The processor resource 110 can also contain and/or communicate with memory (e.g., cache memory), microcontrollers, and/or any other hardware resources a processor may utilize to process commands for graphics processor resource 112 to execute. The graphics processor resource 112 includes one or more graphics processors (e.g., GPUs), where each graphics processor has one or more execution cores and other computing logic for performing graphics and/or general compute operations. Stated another way, the graphics processor resource 112 may also encompass and/or communicate with memory (e.g., cache memory), and/or other hardware resources to execute programs, such as shaders. For example, graphics processor resource 112 is able to process graphics-related shaders with a rendering pipeline and compute shaders with a compute pipeline.

FIG. 1 illustrates that one or more applications 101A-N may generate graphics API calls for the purpose of encoding commands for the graphics processor resource 112 to execute. To generate the graphics API calls, applications 101A-N may include code written with a graphics API. The graphics API may comprise a published and/or standardized graphics library and framework that define functions and/or other operations that applications 101A-N are able to have with a graphics processor. For example, the graphics API allows applications 101A-N to be able to control the organization, processing, and submission of render and compute commands, as well as the management of associated data and resources for those commands.

In one or more implementations, each application 101 is a graphics application that invokes the graphics API to convey a description of a graphics scene. Specifically, the user space driver 102 receives graphics API calls from an application 101 and maps the graphics API calls to operations understood and executable by the graphics processor resource 112. For example, the user space driver 102 can translate the API calls into commands encoded within command buffers before being transferred to kernel driver 103. The translation operation may involve the user space driver 102 compiling graphics shaders and/or compute shaders into commands executable by the graphics processor resource 112. The command buffers are then sent to the kernel driver 103 to prepare the command buffers for execution on the graphics processor resource 112. As an example, the kernel driver 103 may perform memory allocation and scheduling of the command buffers to be sent to the graphics processor resource 112. For the purpose of this disclosure and to facilitate ease of description and explanation, unless otherwise specified, the user space driver 102 and the kernel driver 103 are collectively referred to as a graphics driver.

FIG. 1 illustrates that the graphics processor firmware 104, which can be executed on an embedded microcontroller within a graphics processor, obtains command buffers that processor resource 110 commits for execution. The graphics processor firmware 104 can perform a variety of operations to manage the graphics processor hardware 105 that includes powering up the graphics processor hardware 105 and/or scheduling the order of commands that the graphics processor hardware 105 receives for execution. After scheduling the commands, in FIG. 1, the graphics processor firmware 104 sends command streams to the graphics processor hardware 105. The graphics processor hardware 105 then executes the commands within the command streams according to the order the graphics processor hardware 105 receives the commands. The graphics processor hardware 105 includes numerous execution cores, and thus, can execute a number of received commands in parallel.

Graphics processor hardware 105 may also comprise of and/or produce one or more hardware counters 108. Hardware counters 108 may monitor the real-time status of one or more performance and/or architectural limitations of the graphics processor at a given moment in time. For example, hardware counters 108 may comprise one or more of: a shader core occupancy metric, a limiter, or a memory bandwidth metric. In some embodiments, hardware counters may be normalized to a particular predefined range (e.g., 0 to 1) and/or scaled for the capabilities or limits of a given graphics hardware before being presented to a user of a GPU visualization program. E.g., a shader core occupancy counter value of 0.95 for a first GPU may reflect a much higher absolute value than a shader core occupancy counter value of 0.95 for a second GPU (i.e., a second GPU with different specs), but the counter value of 0.95 would reflect the fact that each GPU was at 95% capacity of its respective shader core occupancy at a given moment in time. In other embodiments, the output of the hardware counter values may be abstracted to a higher level of detail (e.g., "shader core occupancy is HIGH") and or over a particular temporal range (e.g., shader core occupancy was in excess of its maximum desired limit for 33% of the selected time interval) before being presented to a user of a GPU visualization program. In still other embodiments, the raw hardware counter output values themselves may be used, e.g., if it is desired to expose that degree of detail to users of a GPU visualization program. The various hardware counters 108 of a given graphics processing hardware may be sampled from in a defined or regular pattern, according to the needs of a given implementation. For example, in some implementations, the hardware counters may be sampled at fixed time steps. The time step determines the resolution of the obtained hardware counter data, but should not affect the accuracy of the aggregate counts.

Graphics processor hardware 105 may also comprise of and/or produce one or more shader profiling samples 109. Shader profiling samples 109 may monitor the real-time status of one or more shader programs executing on the graphics processor at a given moment in time. According to some embodiments, the various shaders across the various shader cores of the graphics processor hardware may be samples stochastically and then reassembled to determine approximated shader execution intervals for the various shader programs executing on the graphics processor. For example, The graphics processor hardware 105 then outputs rendered frames to frame buffer 106. In one implementation, the frame buffer 106 is a portion of memory, such as a memory buffer, that contains a bitmap that drives display 107. Display 107 subsequently access the frame buffer 106 and converts (e.g., using a display controller) the rendered frame (e.g., bitmap) to a video signal for display.

Although FIG. 1 illustrates a specific implementation of graphics processing path 100, the disclosure is not limited to the specific implementation illustrated in FIG. 1. For instance, graphics processing path 100 may include other frameworks, APIs, and/or application layer services not specifically shown in FIG. 1. As an example, application 101 may have access to other frameworks to animate views and/or user interfaces for applications 101A-N. FIG. 1 also does not illustrate all of the hardware resources and/or components that graphics processing path 100 may utilize (e.g., power management units or memory resources, such as cache or system memory). Additionally, or alternatively, even though FIG. 1 illustrates that processor resource 110 and graphics processor resource 112 are separate devices, other implementations could have the processor resource 110 and graphics processor resource 112 integrated on a single device (e.g., a system-on-chip). The use and discussion of FIG. 1 is only an example to facilitate ease of description and explanation.

Illustrative Software Architecture Diagram

Implementations within this disclosure include the use of software and software frameworks. As such, a description of common computing software architecture is provided as expressed in a layer diagram in FIG. 2. Like the hardware examples, the software architecture discussed here is not intended to be exclusive in any way, but rather to be illustrative. In the example of FIG. 2, the description begins with layers starting with the base hardware layer 295 illustrating hardware layer 240, which may include memory, general purpose processors, graphics processors, microcontrollers, or other processing and/or computer hardware such as memory controllers and specialized hardware.

Above the hardware layer is the operating system kernel layer 290 showing an example as operating system kernel 245, which is kernel software that may perform memory management, device management, and system calls. The operating system kernel layer 290 is the typical location of hardware drivers, such as graphics processor drivers. The notation employed here is generally intended to imply that software elements shown in a layer use resources from the layers below and provide services to layers above. However, in practice, all components of a particular software element may not behave entirely in that manner.

Returning to FIG. 2, operating system services layer 285 is exemplified by operating system services 250. Operating system services 250 may provide core operating system functions in a protected environment. In addition, operating system services shown in operating system services layer 285 may include frameworks for OpenGL®/OpenCL® 251 or the like, Metal® 252, user space drivers 253 (also shown as user space driver 102 in FIG. 1), and/or a Software Rasterizer 254. (OPENGL is a registered trademark of Silicon Graphics International Corp. OPENCL and METAL are registered trademarks of Apple Inc.) While most of these examples all relate to graphics processor processing or graphics and/or graphics libraries, other types of services are contemplated by varying implementations of the disclosure. These particular examples also represent graphics frameworks/libraries that may operate in the lower tier of frameworks, such that developers may use shading and primitives and/or obtain fairly tightly coupled control over the graphics hardware. In addition, the particular examples named in FIG. 2 may also pass their work product on to hardware or hardware drivers, such as the graphics processor driver, for display-related material or compute operations.

Referring again to FIG. 2, OpenGL®/OpenCL® 251 represent examples of well-known libraries and application programming interfaces for graphics processor compute operations and graphics rendering, including 2D and 3D graphics. Metal® 252 also represents a published graphics library and framework, but it is generally considered lower level than OpenGL®/OpenCL® 251, supporting fine-grained, low-level control of the organization, processing, and submission of graphics and computation commands, as well as the management of associated data and resources for those commands. User space drivers 253 is software relating to the control of hardware that exists in the user space for reasons that are typically related to the particular device or function. In many implementations, user space drivers 253 work cooperatively with kernel drivers and/or firmware to perform the overall function of a hardware driver. Software Rasterizer 254 refers generally to software used to make graphics information such as pixels without specialized graphics hardware (e.g., using only the CPU). These libraries or frameworks shown within the operating system services layer 285 are only exemplary and intended to show the general level of the layer and how it relates to other software in a sample arrangement (e.g., kernel operations usually below and higher-level Applications Services 260 usually above).

Above the operating system services layer 285 there is an Application Services layer 280, which includes Sprite Kit® 261, Scene Kit® 262, Core Animation® 263, Core Graphics 264, and other Applications Services 260. (SPRITEKIT, SCENEKIT, and CORE ANIMATION are registered trademarks of Apple Inc.) The operating system services layer 285 represents higher-level frameworks that are commonly directly accessed by application programs. In some implementations of this disclosure, the operating system services layer 285 includes graphics-related frameworks that are high level in that they are agnostic to the underlying graphics libraries (such as those discussed with respect to operating system services layer 285). In such implementations, these higher-level graphics frameworks are meant to provide developer access to graphics functionality in a more user/developer friendly way and allow developers to avoid work with shading and primitives. By way of example, Sprite Kit® 261 is a graphics rendering and animation infrastructure made available by Apple Inc. Sprite Kit® 261 may be used to animate textured images or "sprites." Scene Kit® 262 is a 3D-rendering framework from Apple Inc. that supports the import, manipulation, and rendering of 3D assets at a higher level than frameworks having similar capabilities, such as OpenGL®. Core Animation® 263 is a graphics rendering and animation infrastructure made available from Apple Inc. Core Animation® 263 may be used to animate views and other visual elements of an application. Core Graphics 264 is a two-dimensional drawing engine from Apple Inc., which provides 2D rendering for applications.

Above the application services layer 280, there is the application layer 275, which may comprise any type of application program. By way of example, FIG. 2 shows three exemplary applications: photos 271 (e.g., a photo management, editing, and sharing program), a financial management program 272, and iMovie® 273 (e.g., a movie making and sharing program). (IMOVIE is a registered trademark of Apple Inc.). Application layer 275 also shows two generic applications 270 and 274, which represent the presence of any other applications that may interact with or be part of the inventive implementations disclosed herein. Generally, some implementations of the disclosure employ and/or interact with applications that produce displayable and/or viewable content or produce computational operations that are suited for GPU processing.

In evaluating operating system services layer 285 and applications services layer 280, it may be useful to realize that different frameworks have higher- or lower-level application program interfaces, even if the frameworks are represented in the same layer of the FIG. 2 diagram. The illustration of FIG. 2 serves to provide a general guideline and to introduce exemplary frameworks that may be discussed later. Furthermore, some implementations of the disclosure may imply that frameworks in application services layer 280 make use of the libraries represented in operating system services layer 285. Thus, FIG. 2 provides reinforcement for these examples. Importantly, FIG. 2 is not intended to limit the types of frameworks or libraries that may be used in any particular way or in any particular implementation. Generally, many implementations of this disclosure relate to the ability of applications in layer 275 or frameworks in layers 280 or 285 to utilize a graphics processor to perform one or more ongoing tasks in the form of discrete "kicks" or pieces of work sent to the graphics processor. In addition, many implementations of the disclosure relate to graphics processor driver software in operating system kernel layer 290 and/or embodied as microcontroller firmware in hardware layer 295; such drivers performing a scheduling function for the graphics processor resource (e.g., a GPU).

Illustrative Visualization Tool User Interface

Figure 3:
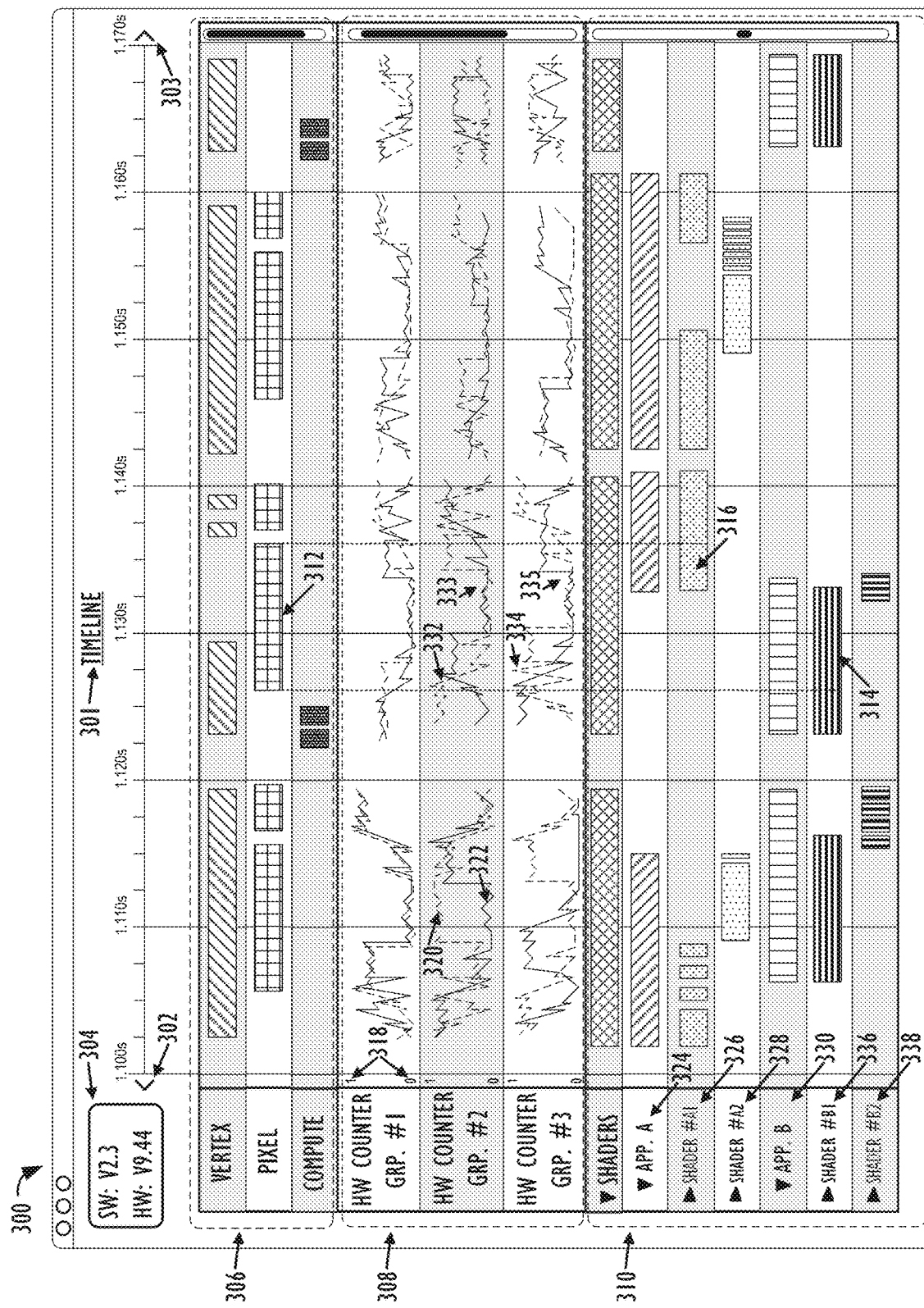
FIG. 3 is an implementation of an exemplary user interface for the visualization of graphics hardware performance.

FIG. 3 depicts an implementation of an exemplary user interface 300 for the visualization of graphics hardware performance. In some implementations, user interface may comprise a common timeline 301, which a programmer or user may be able to interact with, e.g., via left arrow 302 or right arrow 303, to move "forward" or "backward" in time over a given time interval during which the graphics hardware's performance and been monitored and profiled. In some implementations, a programmer or user may be able to select or highlight sub-portions of the common timeline 301 that may be of particular interest and/or zoom-in or zoom-out on portions of common timeline 301 that may be of particular interest. In some implementations, the user interface 300 may also include versioning information 304, e.g., to display the current version and/or model number of the hardware and/or software whose graphics performance is being profiled in the user interface 300. This may be useful information because, as described above, in some implementations, the obtained graphics hardware metrics may be scaled or normalized based on the particular hardware and/or software of the device being monitored and profiled.

Returning to the exemplary user interface 300, below the common timeline 301 are the kick performance graphs 306 for the various channels of the graphics hardware. For example, there is a performance graph showing the execution of kicks from each of the: vertex, pixel (i.e., "render" or "fragment"), and compute channels of the graphics hardware that is being monitored. The information in performance graphs 306 alone provides a relatively coarse level of granularity into the graphics hardware's performance, as they do not correlate the usage of these channels to any particular shader programs during a given time interval.

Returning to the exemplary user interface 300, below the kick performance graphs 306 are the graphics hardware performance counter graphs 308. In some embodiments, the graphics hardware performance metrics monitored and obtained for a given piece of graphics hardware may be divided into one or more groups, as desired, for ease of visualization and/or interpretation. As shown in exemplary user interface 300, there are three distinct groups of graphics hardware counters being plotted across common timeline 301 (i.e., "HW COUNTER GROUP #1," "HW COUNTER GROUP #2," and "HW COUNTER GROUP #3"). As may be understood, more or fewer groups of hardware counters may be used in a given implementation, and user interface 300 is merely exemplary. As mentioned above, each group of graphics hardware counters may also be plotted on a normalized scale 318, if so desired, e.g., normalizing the values of each counter type to a common and/or predefined range with an easily understood meaning, such as 0 to 1. Within each graphics hardware counter group, one or more hardware counters may be plotted across the common timeline 301, e.g., hardware counter 320 and hardware counter 322 in HW COUNTER GROUP #2 may each represent a related, but distinct, architectural element or limitation of the graphics hardware being monitored and profiled.

Returning to the exemplary user interface 300, below the graphics hardware performance counter graphs 308 are the shader program profiling graphs 310, which show the shader program execution intervals determined, based at least in part, on timestamped shader samples collected by the system during an observation time period. In exemplary user interface 300, there are two different application processes making use of the graphics hardware during the observation time period (i.e., "Application A" 324 and "Application B" 330). Each such application may be executing one or more shader programs during the observation time period (e.g., "Shader #A1" 326 and "Shader #A2" 326, in the case of "Application A" 324, and "Shader #B1" 336 and "Shader #B2" 338, in the case of "Application B" 330). As illustrated in exemplary user interface 300, the various shader programs (and their respective determined execution intervals) of the various executing applications that are being monitored and profiled may be presented in a groupable and/or collapsible fashion, as is desired, to allow the programmer or other user the ability to more easily view additional detail on particular shader programs and/or isolate the review of particular applications, as is needed, during a debugging or profiling process.

For example, by utilizing the exemplary user interface 300, a programmer may be interested in learning more about pixel kick 312, which spans from roughly the 1.125 s mark to the 1.135 s mark along common timeline 301. In particular, the programmer may wish to know which shader programs (and, by extension, which applications) are responsible for the particularly high hardware counter values in "HW COUNTER GROUP #2" and "HW COUNTER GROUP #3" during the first half of the pixel kick 312 (as shown in FIG. 3 by arrows 332 and 334). By looking down in the user interface 300 to the shader program profiling graphs 310, e.g., between roughly the 1.125 s mark to the 1.132 s mark along common timeline 301 (i.e., roughly the first half of pixel kick 312), it may be seen that shader "Shader #B1" 336 (represented in box 314) was the dominant shader executing during that time interval. This would tend to suggest that "Shader #B1" 336 was the program causing the counter values in "HW COUNTER GROUP #2" and "HW COUNTER GROUP #3" to be approaching their architectural limits during the first half of pixel kick 312, and may need to be debugged or optimized by the programmer, e.g., if a high countervalues in these particular countergroups are indicative of poor performance. By contrast, between roughly the 1.132 s mark to the 1.135 s mark along common timeline 301 (i.e., roughly the second half of pixel kick 312), it may be seen that shader "Shader #A1" 326 (represented in box 316) was the dominant shader executing during that time interval. However, the counter values in "HW COUNTER GROUP #2" and "HW COUNTER GROUP #3" referred to earlier returned to much lower levels during the second half of pixel kick 312 (as shown in FIG. 3 by arrows 333 and 335). This would tend to suggest that "Shader #A1" 326 was not causing any particular issues that would need to be debugged or optimized by the programmer at the present time (again, assuming that high counter values in these particular counter groups are indicative of poor performance). It is to be understood that, in other implementations (and/or for other counters or counter groups), high counter values may be indicative of good performance and low counter values may be indicative of poor performance. A user of the performance visualization tool would thus benefit from knowing the meaning/significance of each relevant hardware counter being tracked in a given implementation, in order to best debug and/or optimize his or her code for better performance.

Visualization Operational Flowchart

Figure 4:
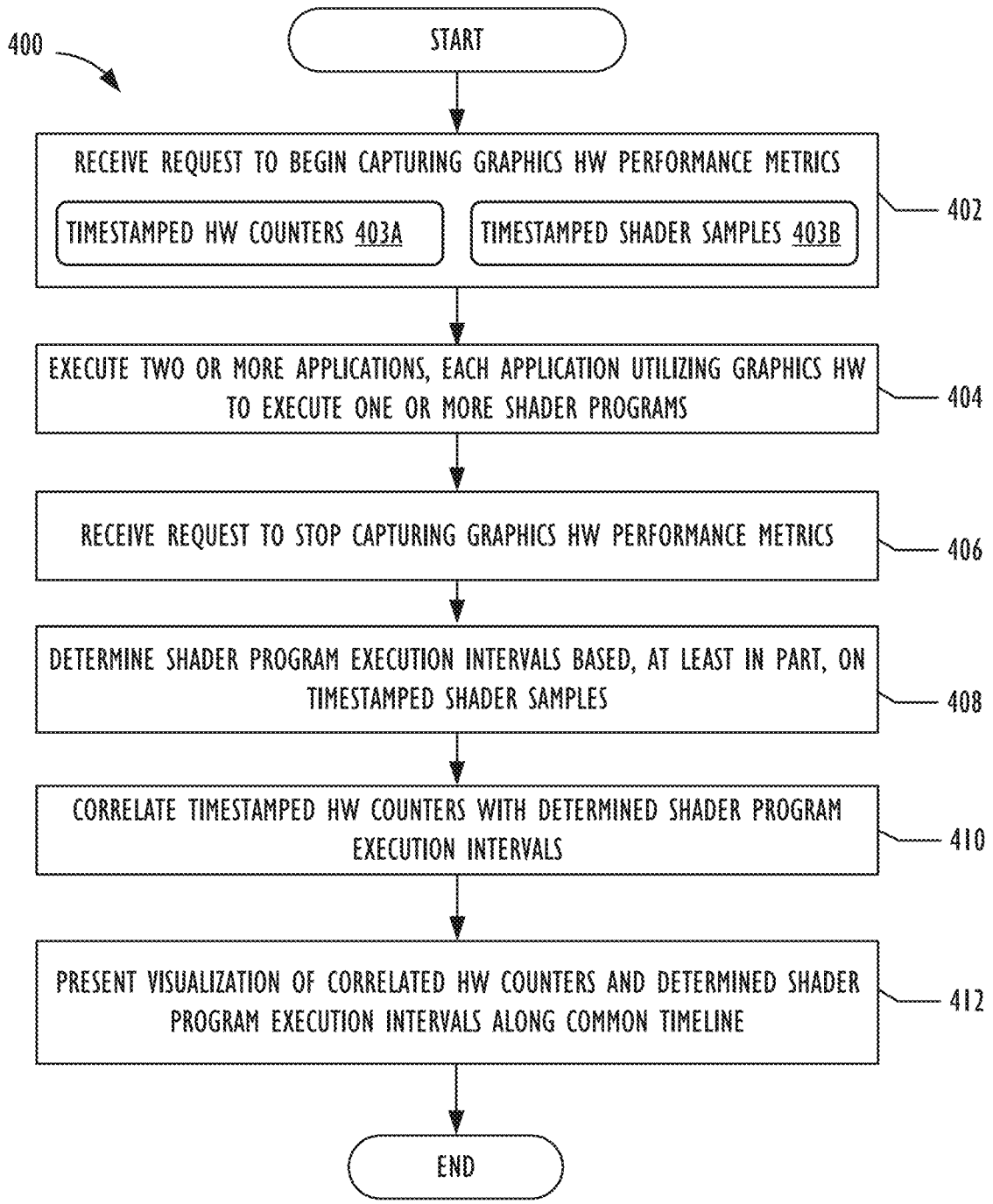
FIG. 4 depicts a flowchart illustrating a processing operation for analyzing and visualizing graphics hardware performance.

FIG. 4 depicts a flowchart illustrating a graphics processing operation 400 for analyzing and visualizing graphics hardware performance across various different shader programs and executing applications on a given system. Operation 400 may be implemented, for example, by graphics processor resource 112 shown in FIG. 1. For example, operation 400 may be implemented by a GPU of a computing system. Specifically, blocks within operation 400 could be implemented by an embedded microcontroller and execution cores within the GPU. The use and discussion of FIG. 4 is only an example to facilitate explanation and is not intended to limit the disclosure to this specific example.

Operation 400 may thus start at block 402 by receiving a request, e.g., from a computing device or system, to begin capturing graphics hardware performance metrics. According to some embodiments, at least a first portion of the graphics hardware performance metrics may comprise one or more timestamped hardware counters 403A (e.g., such as hardware counters 108 described above with reference to FIG. 1). In some embodiments, the hardware counters 403A may be specially designed and/or included in the relevant portions of the graphics hardware to measure relevant values, usage, performance, etc., of various parts of the graphics hardware's architecture, and they may be timestamped to a common timeline for the computing device or system, such that a timestamp of value 'A' for a graphics hardware counter and a timestamp of value 'A' for an event taking place in the computing device or system's main memory sub-system, for example, would reflect events that occurred at the same moment in time. According to some embodiments, at least a second portion of the graphics hardware performance metrics may further comprise one or more timestamped shader samples 403B. Such shader samples may be obtained during the execution of the two or more applications that the user is interested in profiling. According to some embodiments, the various executing shaders may be sampled (e.g., stochastically) and then the samples from each shader may be correlated back to a common timeline, such that the execution intervals for each individual executing shader may be determined (and later visualized by the user, as described above with reference to FIG. 3).

At block 404, the computing device or system may begin (or may simply continue) to execute two or more applications, each of which applications may, from time to time during the operation 400, utilize the graphics hardware to execute one or more shader programs. As mentioned above, shader programs may include vertex, geometry, tessellation (e.g., hull and domain), fragment (i.e., pixel), and/or compute shaders. At block 406, the computing device or system may receive a request to stop capturing the graphics hardware performance metrics.

Then, at block 408, the operation 400 may determine the execution intervals of each executing shader program based, at least in part, on the timestamped shader samples 403B, as described above. In other words, rather than simply knowing that a certain set of shaders were being executed by a set of applications during a given observation time period, block 408 allows the user to visualize exactly which shaders were executing during which parts of the observation time period. With this information, rather than simply knowing that the graphics hardware's fragment (i.e., pixel) channel was busy during a particular time interval, the user may determine which particular shader program(s) that were executing on the graphics hardware during the particular time interval were causing the fragment channel to be busy.

At block 410, the operation 400 may correlate the time-stamped graphics hardware counters 403A with the determined shader program execution intervals from block 408. In other words, because the various performance metrics may come from disparate sources within the graphics hardware, correlating the various "kicks" of work, hardware counters, and shader programs initiating said "kicks" of work across a common timeline allows for the presentation of a coherent visualization, wherein the sources or causes of particular bottlenecks or other architectural limiters may be narrowed down or directly identified-down to the individual shader level.

As mentioned above, this information may be gathered in a single-pass operation—and may provide a system-level analysis, i.e., span across multiple concurrently executing applications that are utilizing the graphics hardware resource. Another potential advantage of the "single-pass" and "system-level" profiling techniques described herein is that the common timeline referred to herein may also be common to the entire computing device or system. For example, not only may performance metrics from disparate sources within the GPU be correlated, but other debugging and profiling events from other parts of the system, e.g. the CPU, the main memory sub-system, etc., may also be correlated to the same common timeline as the GPU events. This allows a user or programmer to view the GPU hardware counters and shader profiling data in a truly system-wide context, e.g., in a user interface such as exemplary user interface 300 described above with reference to FIG. 3.

Finally, at block 412, the results of correlating the obtained graphics hardware counters and the execution intervals of the various shader programs may be presented to a user, e.g., in the form of a user interface visualization of GPU performance (such as the user interface 300 described above with reference to FIG. 3), which may correlate the various statuses of the graphics hardware's data channels, performance counter/limiters, and/or shader program utilization across a common timeline. In other embodiments, the visualization of the GPU's performance may be constructed and updated in the user interface of a GPU performance analysis tool in 'real-time,' i.e., without waiting for an express indication from a user (e.g., at block 406) to stop capturing the graphics hardware performance metrics before generating and/or presenting the visualization of the graphics hardware's utilization.

Illustrative Electronic Devices

The disclosure may have implication and use in and with respect to variety of electronic devices, including single- and multi-processor computing systems, and vertical devices (e.g., cameras, gaming systems, appliances, etc.) that incorporate single- or multi-processing computing systems. The discussion herein is made with reference to a common computing configuration for many different electronic computing devices (e.g., computer, laptop, mobile devices, etc.). This common computing configuration may have a CPU resource including one or more microprocessors and a graphics processing resource including one or more GPUs. Other computing systems having other known or common hardware configurations (now or in the future) are fully contemplated and expected. While the focus of some of the implementations relate to mobile systems employing minimized GPUs, the hardware configuration may also be found, for example, in a server, a workstation, a laptop, a tablet, a desktop computer, a gaming platform (whether or not portable), a television, an entertainment system, a smart phone, a phone, or any other computing device, whether mobile or stationary, vertical, or general purpose.

Figure 5:
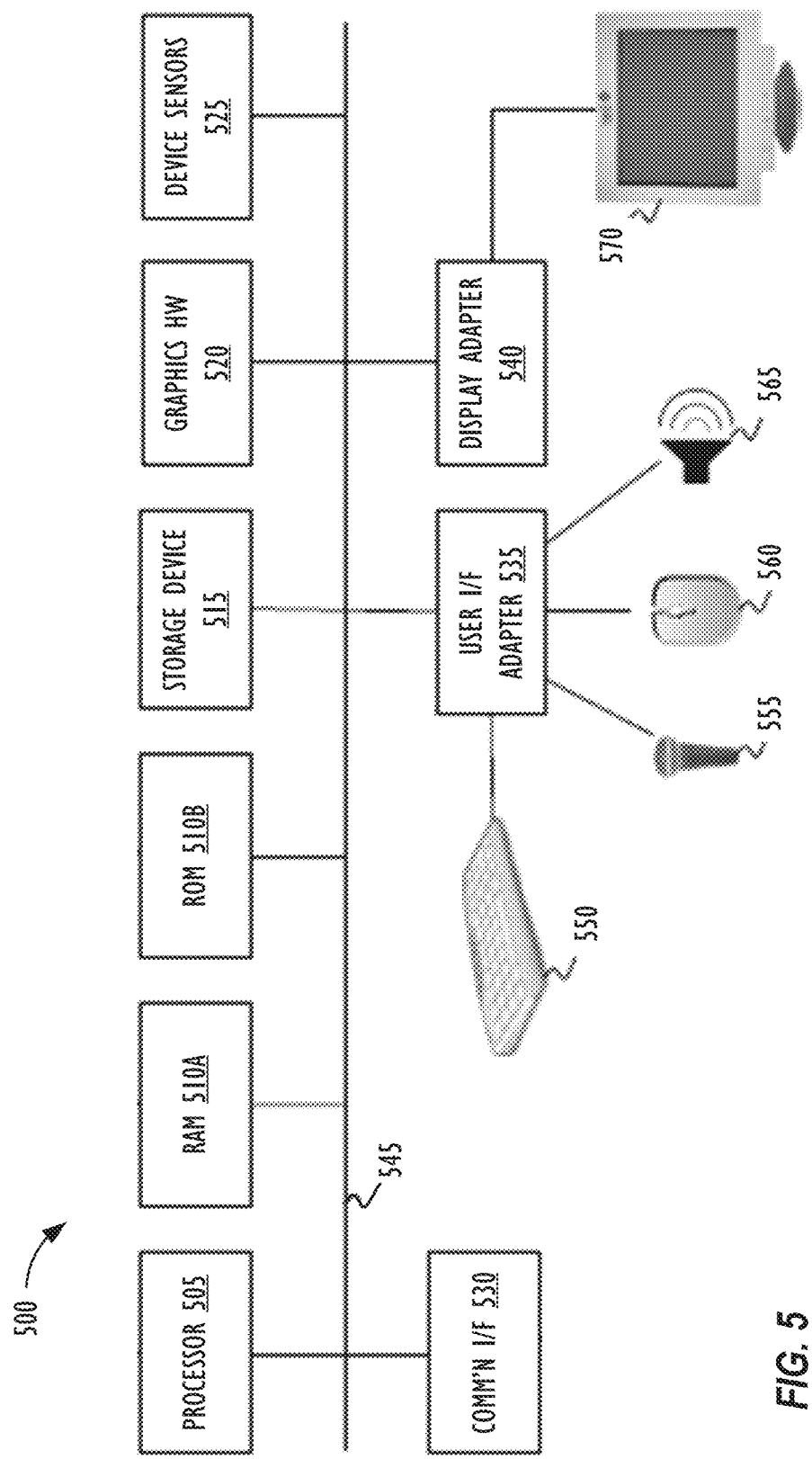
FIG. 5 is a block diagram of a computing system where implementations of the present disclosure may operate.

Referring to FIG. 5, the disclosed implementations may be performed by representative computing system 500. For example, the representative computer system may act as an end-user device or any other device that produces or displays graphics. For example, computing system 500 may be embodied in electronic devices, such as a general purpose computer system, a television, a set top box, a media player, a multi-media entertainment system, an image processing workstation, a hand-held device, or any device that may be coupled with or may incorporate display or presentation devices as discussed herein. Computing system 500 may include one or more processors 505, memory 510 (510A and 510B), one or more storage devices 115, and graphics hardware 520 (e.g., including one or more graphics processors). Computing system 500 may also have device sensors 525, which may include one or more of: depth sensors (such as a depth camera), 3D depth sensor(s), imaging devices (such as a fixed and/or video-capable image capture unit), RGB sensors, proximity sensors, ambient light sensors, accelerometers, gyroscopes, any type of still or video camera, LIDAR devices, SONAR devices, microphones, CCDs (or other image sensors), infrared sensors, thermometers, etc. These and other sensors may work in combination with one or more GPUs, DSPs or conventional microprocessors along with appropriate programming so the sensor outputs may be properly interpreted and/or combined and interpreted.

Returning to FIG. 5, system 500 may also include communication interface 530, user interface adapter 535, and display adapter 540—all of which may be coupled via system bus, backplane, fabric or network 545. Memory 510 may include one or more different types of non-transitory media (e.g., solid-state, DRAM, optical, magnetic, etc.) used by processor 505 and graphics hardware 520. For example, memory 510 may include memory cache, read-only memory (ROM) 510B, and/or random access memory (RAM) 510A. Storage device 515 may include one or more non-transitory storage media including, for example, magnetic disks (fixed, floppy, and removable) and tape, optical media such as CD-ROMs and digital video disks (DVDs), and semiconductor memory devices such as Electrically Programmable Read-Only Memory (EPROM), solid state storage drives, and Electrically Erasable Programmable Read-Only Memory (EEPROM). Memory 510 and storage device 515 may be used to retain media data (e.g., audio, image, and video files), preference information, device profile information, computer program instructions organized into one or more modules and written in any desired computer programming language, and any other suitable data. When executed by processor 505 and/or graphics hardware 520, such computer program code may implement one or more of operations or processes described herein. In addition, the system may employ microcontrollers (not shown), which may also execute such computer program code to implement one or more of the operations or computer readable media claims illustrated herein. In some implementations, the microcontroller(s) may operate as a companion to a graphics processor or a general-purpose processor resource.

Communication interface 530 may include semiconductor-based circuits and may be used to connect computing system 500 to one or more networks. Illustrative networks include, but are not limited to: a local network, such as a USB network; a business's local area network; and a wide area network such as the Internet and may use any suitable technology (e.g., wired or wireless). Communications technologies that may be implemented include cell-based communications (e.g., LTE, CDMA, GSM, HSDPA, etc.) or other communications (e.g., Ethernet, WiFi®, Bluetooth®, USB, Thunderbolt®, Firewire®, etc.). (WIFI is a registered trademark of the Wi-Fi Alliance Corporation. BLUETOOTH is a registered trademark of Bluetooth Sig, Inc. THUNDERBOLT and FIREWIRE are registered trademarks of Apple Inc.). User interface adapter 535 may be used to connect keyboard 550, microphone 555, pointer device 560, speaker 565, and/or other user interface devices such as a touchpad and/or a touch screen (not shown). Display adapter 540 may be used to connect one or more displays 570.

Processor 505 may execute instructions necessary to carry out or control the operation of many functions performed by computing system 500 (e.g., evaluation, transformation, mathematical computation, or compilation of graphics programs, etc.). Processor 505 may, for instance, drive display 570 and receive user input from user interface adapter 535 or any other user interfaces embodied by a system. User interface adapter 535, for example, can take a variety of forms, such as a button, a keypad, a touchpad, a mouse, a dial, a click wheel, a keyboard, a display screen, and/or a touch screen. In addition, processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 in performing computational tasks. In some implementations, graphics hardware 520 may include CPU-integrated graphics and/or one or more discrete programmable GPUs. Computing system 500 (implementing one or more implementations discussed herein) can allow for one or more users to control the same system (e.g., computing system 500) or another system (e.g., another computer or entertainment system) through user activity, which may include audio instructions, natural activity, and/or pre-determined gestures such as hand gestures.

Various implementations within the disclosure may employ sensors, such as cameras. Cameras and like sensor systems may include auto-focus systems to accurately capture video or image data ultimately used in a variety of applications, such as photo applications, augmented reality applications, virtual reality applications, and gaming. Processing images and performing recognition on the images received through camera sensors (or otherwise) may be performed locally on the host device or in combination with network accessible resources (e.g., cloud servers accessed over the Internet).

Returning to FIG. 5, device sensors 525 may capture contextual and/or environmental phenomena such as time; location information; the status of the device with respect to light, gravity, and the magnetic north; and even still and video images. In addition, network-accessible information such as weather information may also be used as part of the context. All captured contextual and environmental phenomena may be used to provide context to user activity or information about user activity. For example, in accessing a gesture or the expression or emotion of a user, the contextual information may be used as part of the analysis, and the analysis may be performed using the techniques discussed herein.

Output from the device sensors 525 may be processed, at least in part, by processors 505 and/or graphics hardware 520, and/or a dedicated image processing unit incorporated within or without computing system 500. Information so captured may be stored in memory 510 and/or storage 515 and/or any storage accessible on an attached network. Memory 510 may include one or more different types of media used by processor 505, graphics hardware 520, and device sensors 525 to perform device functions. Storage 515 may store data such as media (e.g., audio, image, and video files); metadata for media; computer program instructions; graphics programming instructions and graphics resources; and other software, including database applications (e.g., a database storing avatar frames), preference information, device profile information, and any other suitable data. Memory 510 and storage 515 may be used to retain computer program instructions or code organized into one or more modules in either compiled form or written in any desired computer programming language. When executed by, for example, a microcontroller, GPU or processor 505, such computer program code may implement one or more of the acts or functions described herein (e.g., interpreting and responding to user activity including commands and/or gestures).

Many other implementations will be apparent to those of skill in the art upon reviewing the above description. The scope of the invention therefore should be determined with reference to the appended claims, along with the full scope of equivalents to which such claims are entitled.

What is claimed is:

1. A non-transitory program storage device, readable by at least one processor and comprising instructions stored thereon to cause the at least one processor to:
   capture, over a first time interval, one or more performance metrics for a graphics processing unit during execution of one or more shader programs from each of two or more applications on the graphics processing unit,
   wherein at least a first portion of the one or more performance metrics comprise timestamped hardware counters associated with the graphics processing unit, and
   wherein at least a second portion of the one or more performance metrics comprise timestamped shader profiling samples;
   determine shader execution intervals for each of the one or more shader programs from each of the two or more applications based, at least in part, on the timestamped shader profiling samples;
   correlate the timestamped hardware counters with the determined shader execution intervals of the one or more shader programs from each of the two or more applications; and
   present a visualization of the correlated hardware counters and the determined shader execution intervals along a common timeline that includes the first time interval.

2. The non-transitory program storage device of claim 1, wherein at least a portion of the one or more performance metrics are produced by the graphics processing unit.

3. The non-transitory program storage device of claim 1, wherein one or more of the hardware counters are normalized to a predefined range before being presented in the visualization.

4. The non-transitory program storage device of claim 1, wherein the instructions to capture the one or more performance metrics comprise instructions to:

capture the one or more performance metrics in a single-pass operation.

5. The non-transitory program storage device of claim 1, wherein the determined shader execution intervals are groupable by application in the visualization.

6. The non-transitory program storage device of claim 1, wherein at least one of the one or more performance metrics comprises: a shader core occupancy metric, a limiter, or a memory bandwidth metric.

7. The non-transitory program storage device of claim 1, wherein the shader profiling samples are sampled stochastically across the one or more shader programs from each of the two or more applications.

8. A system comprising:
a display;
a graphics processing unit;
memory; and
at least one processor operable to interact with the memory, and configured to execute instructions to:
   capture, over a first time interval, one or more performance metrics for the graphics processing unit during execution of one or more shader programs from each of two or more applications on the graphics processing unit,
   wherein at least a first portion of the one or more performance metrics comprise timestamped hardware counters associated with the graphics processing unit, and
   wherein at least a second portion of the one or more performance metrics comprise timestamped shader profiling samples;
   determine shader execution intervals for each of the one or more shader programs from each of the two or more applications based, at least in part, on the timestamped shader profiling samples;
   correlate the timestamped hardware counters with the determined shader execution intervals of the one or more shader programs from each of the two or more applications; and
   present a visualization on the display of the correlated hardware counters and the determined shader execution intervals along a common timeline that includes the first time interval.

9. The system of claim 8, wherein at least a portion of the one or more performance metrics are produced by the graphics processing unit.

10. The system of claim 8, wherein one or more of the hardware counters are normalized to a predefined range before being presented in the visualization.

11. The system of claim 8, wherein the instructions to capture the one or more performance metrics comprise instructions to:
   capture the one or more performance metrics in a single-pass operation.

12. The system of claim 8, wherein the determined shader execution intervals are groupable by application in the visualization.

13. The system of claim 8, wherein at least one of the one or more performance metrics comprises: a shader core occupancy metric, a limiter, or a memory bandwidth metric.

14. The system of claim 8, wherein the shader profiling samples are sampled stochastically across the one or more shader programs from each of the two or more applications.

15. A graphics processing method, wherein at least one processor performs operations comprising:
   capturing, over a first time interval, one or more performance metrics for a graphics processing unit during execution of one or more shader programs from each of two or more applications on the graphics processing unit,
   wherein at least a first portion of the one or more performance metrics comprise timestamped hardware counters associated with the graphics processing unit, and
   wherein at least a second portion of the one or more performance metrics comprise timestamped shader profiling samples;
   determining shader execution intervals for each of the one or more shader programs from each of the two or more applications based, at least in part, on the timestamped shader profiling samples;
   correlating the timestamped hardware counters with the determined shader execution intervals of the one or more shader programs from each of the two or more applications; and
   presenting a visualization of the correlated hardware counters and the determined shader execution intervals along a common timeline that includes the first time interval.

16. The method of claim 15, wherein at least a portion of the one or more performance metrics are produced by the graphics processing unit.

17. The method of claim 15, wherein one or more of the hardware counters are normalized to a predefined range before being presented in the visualization.

18. The method of claim 15, wherein capturing the one or more performance metrics further comprises:
   capturing the one or more performance metrics in a single-pass operation.

19. The method of claim 15, wherein at least one of the one or more performance metrics comprises: a shader core occupancy metric, a limiter, or a memory bandwidth metric.

20. The method of claim 15, wherein the shader profiling samples are sampled stochastically across the one or more shader programs from each of the two or more applications.

* * * * *